(12) United States Patent
Yoshizawa et al.

(10) Patent No.: US 8,662,579 B2
(45) Date of Patent: Mar. 4, 2014

(54) VEHICLE SEAT

(75) Inventors: Norimichi Yoshizawa, Ebina (JP); Masahiro Egami, Hadano (JP); Miharu Takahashi, Nagareyama (JP)

(73) Assignee: Nissan Motor Co., Ltd., Yokohama (JP)

( * ) Notice: Subject to any disclaimer, the term of this patent is extended or adjusted under 35 U.S.C. 154(b) by 76 days.

(21) Appl. No.: 13/410,116

(22) Filed: Mar. 1, 2012

(65) Prior Publication Data

US 2012/0261974 A1 Oct. 18, 2012

(30) Foreign Application Priority Data

Apr. 13, 2011 (JP) .................................. 2011-088719

(51) Int. Cl.
*A47C 7/74* (2006.01)
(52) U.S. Cl.
USPC .................................. 297/180.14; 297/180.13
(58) Field of Classification Search
USPC ........................................ 297/180.13, 180.14
See application file for complete search history.

(56) References Cited

U.S. PATENT DOCUMENTS

| | | | |
|---|---|---|---|
| 6,179,706 B1 * | 1/2001 | Yoshinori et al. .... | 297/180.14 X |
| 6,481,801 B1 * | 11/2002 | Schmale ............... | 297/180.14 X |
| 6,685,553 B2 * | 2/2004 | Aoki ...................... | 297/180.14 X |
| 6,848,742 B1 * | 2/2005 | Aoki et al. ............. | 297/180.14 |
| 7,147,279 B2 * | 12/2006 | Bevan et al. .......... | 297/180.13 X |
| 7,168,758 B2 * | 1/2007 | Bevan et al. .......... | 297/180.13 |
| 7,857,395 B2 * | 12/2010 | Kikuchi et al. ....... | 297/180.14 X |
| 7,931,330 B2 * | 4/2011 | Itou et al. .............. | 297/180.14 |
| 2004/0189061 A1 * | 9/2004 | Hartwich et al. ..... | 297/180.14 |
| 2006/0138812 A1 * | 6/2006 | Aoki ...................... | 297/180.14 |
| 2006/0214480 A1 * | 9/2006 | Terech .................. | 297/180.13 |
| 2006/0284455 A1 * | 12/2006 | Terech .................. | 297/180.14 |
| 2009/0031742 A1 * | 2/2009 | Seo et al. ............... | 297/180.14 X |
| 2009/0218855 A1 * | 9/2009 | Wolas .................... | 297/180.14 |
| 2010/0038937 A1 * | 2/2010 | Andersson et al. ... | 297/180.14 |
| 2010/0045079 A1 * | 2/2010 | Andersson et al. ... | 297/180.14 |
| 2010/0102599 A1 * | 4/2010 | Itou et al. .............. | 297/180.14 |
| 2010/0295339 A1 * | 11/2010 | Siu ......................... | 297/180.14 |
| 2011/0133525 A1 * | 6/2011 | Oota ...................... | 297/180.14 |
| 2011/0260509 A1 * | 10/2011 | Siu ......................... | 297/180.14 |

FOREIGN PATENT DOCUMENTS

| | | |
|---|---|---|
| JP | H09-505499 | 6/1997 |
| WO | WO-95-14409 | 6/1995 |

* cited by examiner

*Primary Examiner* — Rodney B White
(74) *Attorney, Agent, or Firm* — Global IP Counselors, LLP (57) ABSTRACT

A vehicle seat has a cushion pad, a breathable outer cover and an air permeable material layer. The cushion pad includes an air passage extending from an air introducing port disposed at the non-passenger facing surface to a branch passage formed along the passenger facing surface. The branch passage has at least one bypass air passage that extends in a vehicle-widthwise direction of the cushion pad. The breathable outer cover is disposed over the passenger facing surface of the cushion pad. The air permeable material layer is disposed between the cushion pad and the breathable outer cover. The air permeable material layer includes a plurality of vent outlets passing through in a thickness direction of the air permeable material layer. The vent outlets are arranged in at least one column that extends in a direction perpendicular to the vehicle-widthwise direction.

9 Claims, 5 Drawing Sheets

VEHICLE SEAT

CROSS-REFERENCE TO RELATED APPLICATIONS

This application claims priority to Japanese Patent Application No. 2011-088719, filed on Apr. 13, 2011. The entire disclosure of Japanese Patent Application No. 2011-088719 is hereby incorporated herein by reference.

BACKGROUND

1. Field of the Invention

The present invention generally relates to a seat for a vehicle. More specifically, the present invention relates to a vehicle seat having an air passage for introducing air to a cushion pad of the vehicle seat.

2. Background Information

Japanese Laid-Open Patent Publication No. H09-505499 discloses a seat cushion structure that has a cushion pad with a flow passage for introducing conditioned air to the cushion pad. In this publication, air is blown into the cushion pad through the flow passage. The air exits from the cushion pad by an outlet on an outer surface side of the cushion pad. The air exits from the cushion pad and passes through a porous sheet that is covering the outlet. The air is then blow out from a sitting surface of an outer cover of the seat cushion structure.

SUMMARY

It has been discovered that with the technology disclosed in above mentioned publication, when a passenger sits on a seat cushion, a ventilation portion of a porous sheet and an outer upholstery is crushed by the weight of the passenger and an air blow outlet of the cushion pad is often blocked. Consequently, there is a possibility that it will not be possible to satisfactorily deliver blown air to the seated passenger Therefore, one object presented in the present disclosure is to provide a vehicle seat with which blown air can be satisfactorily delivered to a seated passenger and a comfortable sitting feeling can be obtained.

In view of the state of the known technology, one aspect of the present disclosure is to provide a vehicle seat that comprises a cushion pad, a breathable outer cover and an air permeable material layer. The cushion pad includes a passenger facing surface, a non-passenger facing surface and an air passage extending from an air introducing port disposed at the non-passenger facing surface to a branch passage formed along the passenger facing surface. The branch passage has at least one bypass air passage that extends in a vehicle-widthwise direction of the cushion pad. The breathable outer cover is disposed over the passenger facing surface of the cushion pad. The air permeable material layer is disposed between the cushion pad and the breathable outer cover. The air permeable material layer includes a plurality of vent outlets passing through in a thickness direction of the air permeable material layer. The vent outlets are arranged in at least one column that extends in a direction perpendicular to the vehicle-widthwise direction. The bypass air passage extends from the branch passage in the vehicle-widthwise direction adjacent one of the vent outlets. The branch passage and the bypass air passages is at least partially open on the passenger facing surface where the cushion pad borders with the air permeable material layer such that air blown through the branch passage distributes the blown air to the vent outlets and the blown air flows along the bypass air passages in a direction transverse to the thickness direction of the air permeable material layer.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
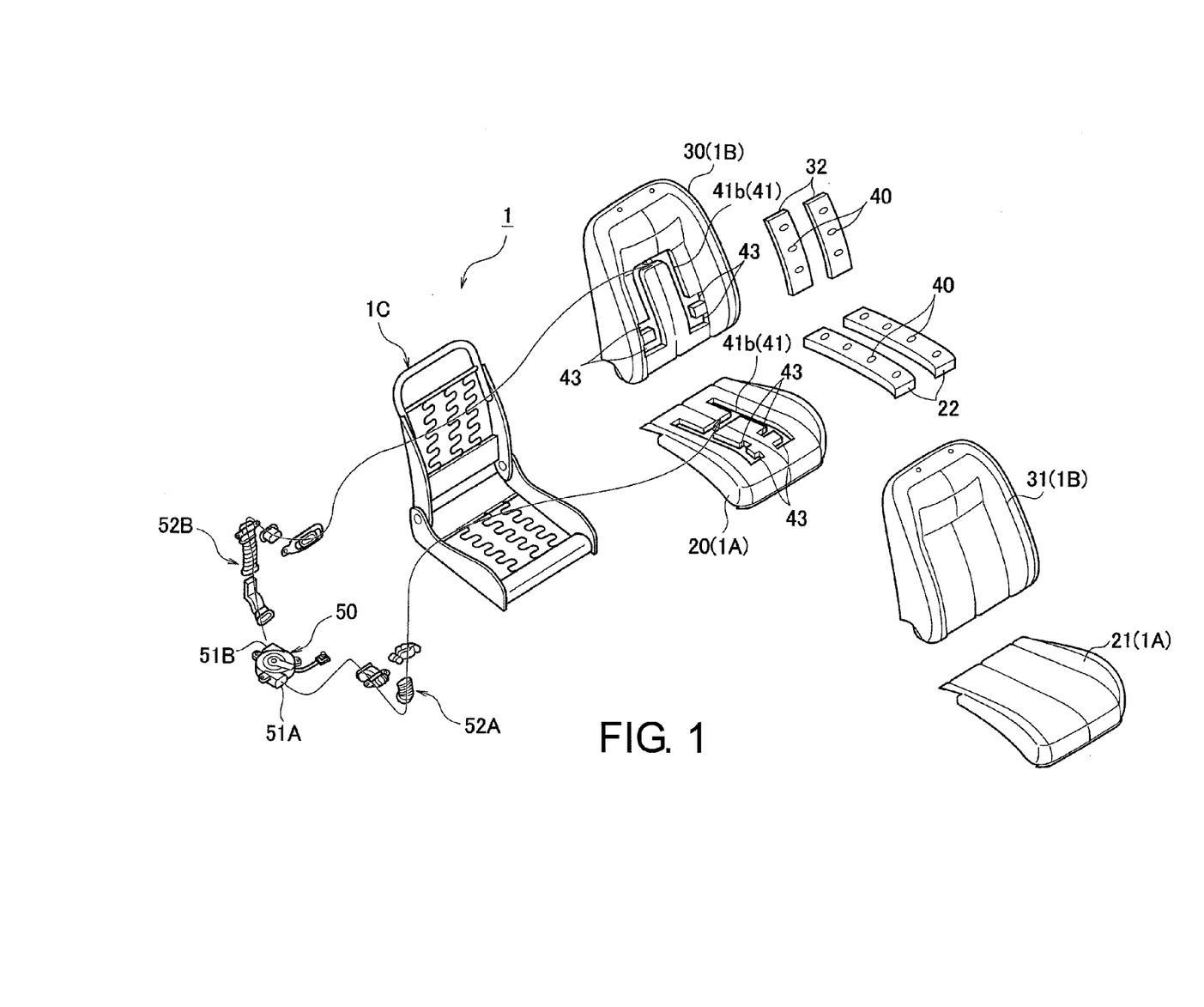
FIG. 1 is an exploded view of a vehicle seat in accordance with in accordance with one illustrative embodiment.

Referring initially to FIG. 1, a vehicle seat 1 is illustrated in accordance with a first embodiment. The vehicle seat 1 has a seat bottom 1A and a seat back 1B serving as seat bodies. The seat bottom 1A and the seat back 1B are attached to a seat frame 1C.

Figure 2:
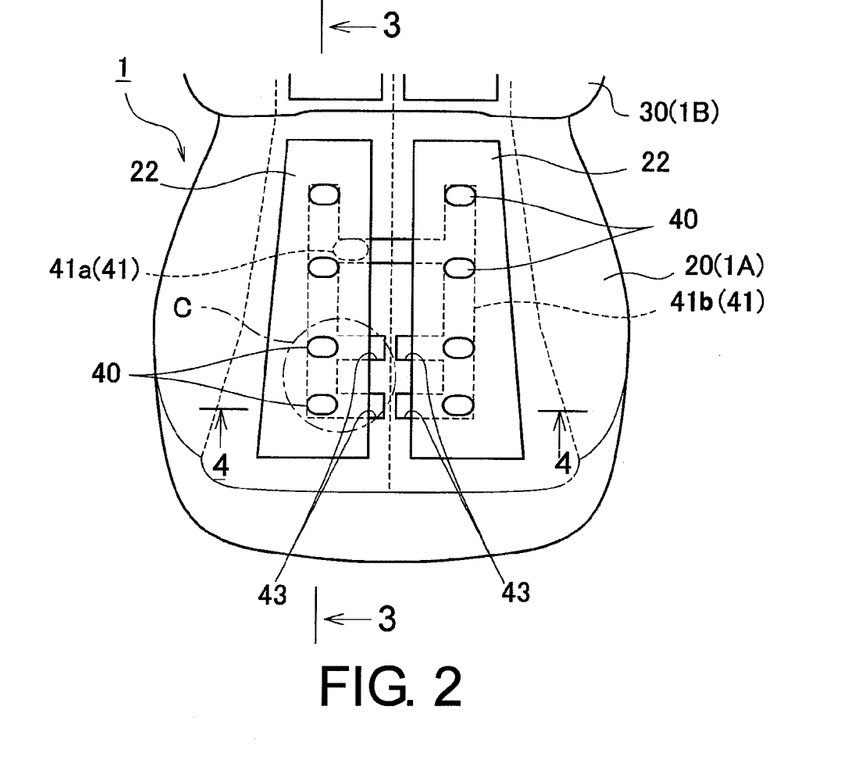
FIG. 2 is a partial top plan view of the seat bottom of the vehicle seat shown in FIG. 1.
Figure 3:
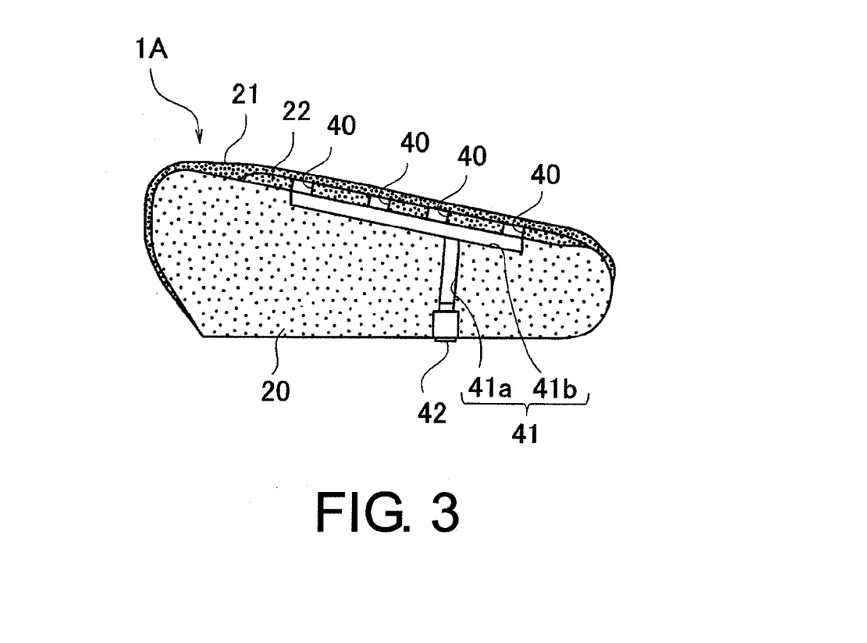
FIG. 3 is a cross sectional view of the seat bottom as viewed along the section line 3-3 of FIG. 2.

As shown in FIGS. 2 and 3, the seat bottom 1A includes a seat cushion pad 20, a breathable seat outer cover 21 and an air permeable material layer 22. The seat outer cover 21 covers at least a portion of an outer surface of the seat cushion pad 20. The air permeable material layer 22 is disposed between the seat outer cover 21 and the seat cushion pad 20 at least along portions of the upper sitting surface of the seat cushion pad 20.

The seat cushion pad 20 is made of an elastic material, e.g., urethane foam, that has a standard spring constant that is typically required for a vehicle seat cushion.

The seat outer cover 21 is a breathable outer cover that is made of a breathable material such as a breathable fabric, a natural leather, a synthetic leather, or an artificial leather The air permeable material layer 22 is made of an elastic sheet material, e.g., a mesh-like urethane foam, through which air can pass in multiple directions within the layer. It is acceptable for the air permeable material layer 22 to be a single large member that covers a wide area corresponding to an entire sitting surface of the seat bottom 1A, i.e., an entire seated passenger support surface. However, in this embodiment the air permeable material layer 22 is formed as a pair of left and right strips corresponding to portions that support the thighs of both legs a seated passenger as shown in FIG. 2. FIG. 2 depicts the seat with the seat outer cover 21 removed for purposes of illustration.

Figure 6:
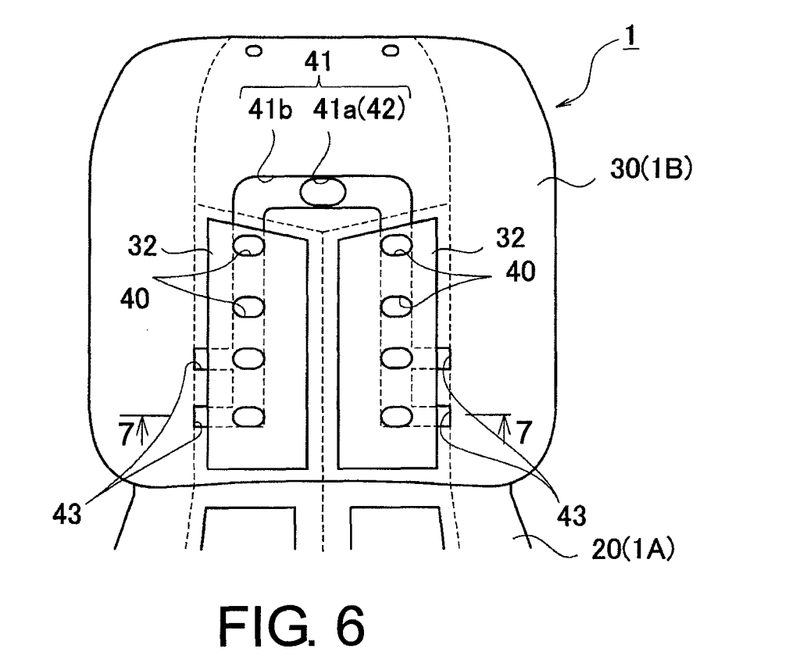
FIG. 6 is an elevational view of the seat back of the vehicle seat shown in FIG. 1.

The seat back 1B includes a cushion pad 30, a breathable seat outer cover 31 and an air permeable material layer 32. The seat outer cover 31 covers at least a portion of an outer surface of the seat cushion pad 30. The air permeable material layer 32 is disposed between the seat outer cover 31 and the seat cushion pad 30 at least along portions of the upper sitting surface of the seat cushion pad 30. The cushion pad 30 has a prescribed spring constant, similar to the cushion pad 20. The air permeable material layer 32 is made such that air can pass through in multiple directions within the layer in the same manner as the air permeable material layer 22. FIG. 6 depicts the seat with the seat outer cover 21 removed for purposes of illustration, similar to FIG. 2.

In this seat back 1B, too, the air permeable material layer 32 is formed as a pair of left and right strips. The left and right strips of the air permeable material layer 32 are arranged on left and right sides of a back support surface that serves as a seated passenger support surface. The left and right strips are arranged corresponding to portions that support portions of a seated passenger's back located on both sides of the seated passenger's spine.

Both of the air permeable material layers 22 and 32 of the seat bottom 1A and the seat back 1B have a plurality of the vent outlets 40. The vent outlets 40 are arranged on both vehicle-widthwise sides. Each of the cushion pads 20 and 30 has at least one air passage 41. The air passage 41 of the cushion pad 20 is in communication with the vent outlets 40 that are provided in the cushion pad 20. Likewise, the air passage 41 of the cushion pad 30 is in communication with the vent outlets 40 that are provided in the cushion pad 30. The vent outlets 40 extend through the air permeable material layers 22 and 32 in a thickness direction of the air permeable material layers 22 and 32. The air passages 41 are arranged to deliver blown air to the vent outlets 40. The vent outlets 40 of the air permeable material layer 22 of the seat bottom 1A are arranged in columns that are oriented along a vehicle-longitudinal direction of the sitting surface of the seat bottom 1A. The vent outlets 40 of the air permeable material layer 32 of the seat back 1B are arranged in columns that are oriented along a vertical direction of the back supporting surface of the seat back 1B.

Each of the air passages 41 is connected to an air introducing port 42 that is provided on a back surface of the seat cushion pad 20 or 30. Each of the air passages 41 branches into a plurality of air passages. Each of the air passages 41 opens at a border surface where the seat cushion pad 20 or 30 borders with the air permeable material layer 22 or 32. In this way, each of the air passages 41 distributes air from an air blower 50 to the vent outlets 40.

The air introducing port 42 of the seat bottom 1A is provided in a substantially middle portion positioned toward a rearward end of the seat cushion pad 20. The air passage 41 includes a main passage 41a and a branch passage 41b. The main passage 41a passes through the seat cushion pad 20 in a vertical direction and connects to the air introduction port 42 at a bottom end. The branch passage 41b branches into a plurality of branches at an upper surface of the seat cushion pad 20. The branch passage 41b connects the main passage 41a to the vent outlets 40 of the air permeable material layer 22. In this embodiment, the branch passage 41b is configured as a trough-like section that is open on a side corresponding to the border surface with respect to the air permeable material layer 22. In a projection plane, i.e., in a top plan view, the branch passage 41b has an H-like shape with portions that extend in a longitudinal direction on the left and right sides so as to span across vent outlets 40 and a middle portion that passes over the main passage 41a (see FIGS. 2 and 3).

The air introducing port 42 of the seat back 1B is provided in a substantially middle portion positioned toward an upper end of the cushion pad 30. The air passage 41 includes a main passage 41a and a branch passage 41b. The main passage 41a that passes through the cushion pad 30 in a rear-to-front direction and connects to the air introduction port 42 at a rearward end. The branch passage 41b branches into a plurality of branches at a frontward surface of the cushion pad 30. The branch passage 41b connects the main passage 41a to the vent outlets 40 of the air permeable material layer 32. In this embodiment, similarly to the seat bottom 1A, the branch passage 41b is configured as a trough-like section that is open on a side corresponding to the border surface with respect to the air permeable material layer 32. In a projection plane, i.e., a frontal view, the branch passage 41b has a U-like shape with portions that extend in a vertical direction on the left and right sides so as to span across the vent outlets 40 and an upper portion that passes over the main passage 41a (see FIG. 6).

The air blower 50 is installed, for example, on a vehicle body floor below the seat bottom 1A. The air blower 50 has two air discharge ports 51A and 51B. The air discharge port 51A is connected to the air introducing port 42 of the seat bottom 1A through a plurality of connecting ducts 52A. The air discharge port 51B is connected to the air introducing port 42 of the seat back 1B through a plurality of connecting ducts 52B.

Bypass air passages 43 oriented in a widthwise direction of the vehicle are provided in the branch passages 41b of the air passages 41 at portions where the branch passages 41b communicate with the vent outlet 40. Each of the bypass air passages 43 is configured as a trough-like section that is open on a side corresponding to the border surface with respect to the air permeable material layer 22 or 32 and closed at a terminal end. Air blown into the air passages 41 can be blown in a planar direction to the air permeable material layers 22 and 32. Thus, the blown air can be blown in a planar direction to the air permeable material layer 22 due to the bypass air passage 43 of the cushion pad 20 or 30 even when small openings of the breathable seat outer cover 21 or 31 of the seat bottom 1A or the seat back 1B and the vent outlets 40 of the air permeable material layer 22 or 32 are crushed or blocked by the weight of a seated passenger. As a result, blown air can pass through portions where the small openings of the air permeable material layer 22 or 32 and the seat outer cover 21 or 31 are not crushed and blow onto the seated passenger.

Figure 4:
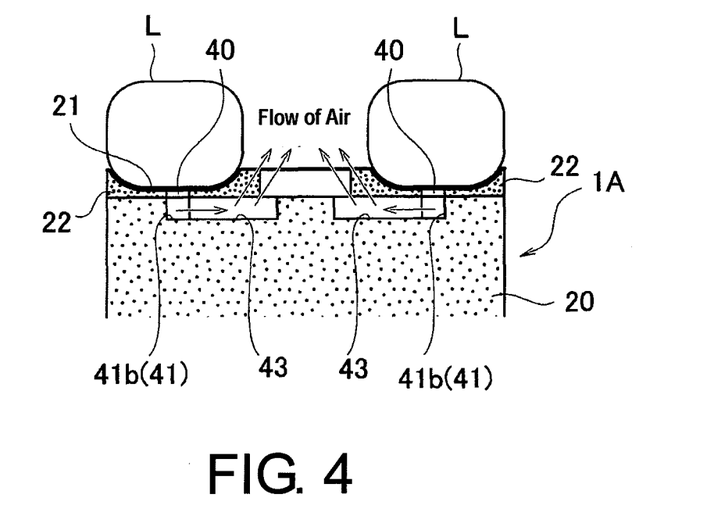
FIG. 4 is a cross sectional view of the seat bottom as viewed along the section line 4-4 of FIG. 2.
Figure 7:
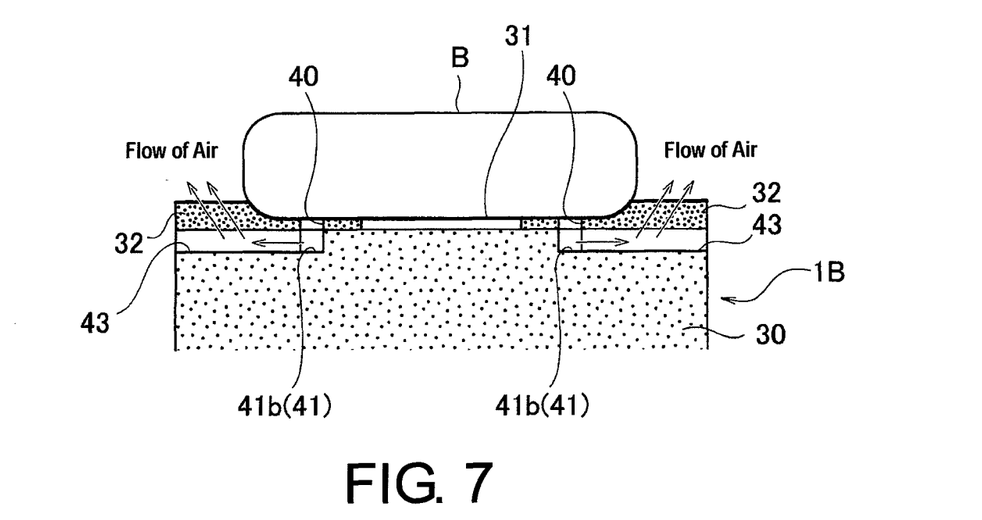
FIG. 7 is a cross sectional view of the seat back as viewed along the section line 7-7 of FIG. 6.

In the seat bottom 1A, as shown in FIG. 2 and FIG. 4, the bypass air passages 43 are provided in a downstream region of branch passage 41b toward a frontward end of the seat bottom 1A such that the bypass air passages 43 are oriented inwardly in a widthwise direction of the vehicle. In the seat back 1B, as shown in FIG. 6 and FIG. 7, the bypass air passages 43 are provided in a downstream region of branch passage 41b toward a lower end of the seat back 1B such that the bypass air passages 43 are oriented outwardly in a widthwise direction of the vehicle.

Figure 5:
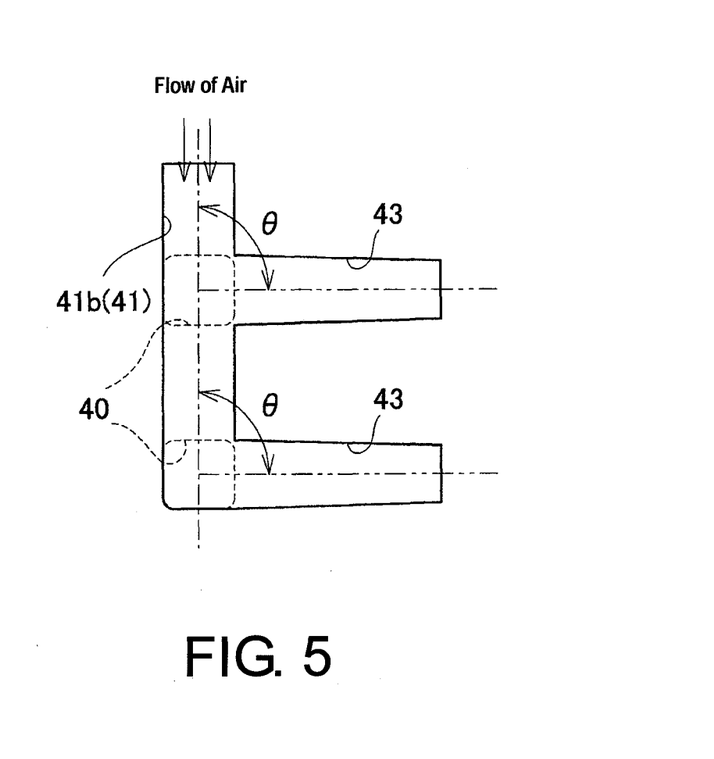
FIG. 5 is an enlarged schematic view of a region C of the seat bottom shown in FIG. 2.

As a representative example, FIG. 5 shows a portion where an air passage 41 communicates with bypass air passages 43; each of the bypass air passages 43 is configured such that a passage size thereof narrows as one moves toward a terminal end. The bypass air passages 43 are configured to form an obtuse angle θ of 90 degrees or larger with respect to a flow direction of blown air in the branch passage 41b of the air passage 41.

With a vehicle seat 1 configured according to this embodiment, conditioned air from inside a vehicle cabin that is blown from the air discharge ports 51A and 51B of the air blower 50 passes through the connecting ducts 52A and 52B and into the air introducing ports 42 of the seat bottom 1A and the seat back 1B. In the seat bottom 1A, the blown air introduced to the air introducing port 42 is distributed from the main passage 41a of the air passage 41 inside the seat cushion pad 20 to the branch passage 41b. The blown air distributed to the branch passage 41b is introduced substantially uniformly to the vent outlets 40 provided in the air permeable material layers 22 provided on both vehicle-widthwise sides. Air blown from the vent ports 40 passes through fine ventilation holes (small openings) in the seat outer cover 21 and is discharged at the sitting surface. As a result, conditioned air can be ventilated (blown) to a lower body (spanning from a buttock portion across a length of the thighs of both legs) of a passenger seated on the seat bottom 1A such that a comfortable sitting environment can be created in which heat and humidity are not trapped at the sitting surface.

In the seat back 1B, the blown air introduced to the air introducing port 42 is distributed from the main passage 41a of the air passage 41 inside the cushion pad 30 to the branch passage 41b. The blown air distributed to the branch passage 41b is introduced substantially uniformly to the vent outlets 40 provided in the air permeable material layers 32 provided on both vehicle-widthwise sides. Air blown from the vent ports 40 passes through fine ventilation holes (small openings) in the seat outer cover 31 and is discharged at the back support surface As a result, conditioned air can be ventilated (blown) to an upper body (spanning from a lower back area to a portion near a shoulder area) of a passenger whose back rests on the seat back 1B such that a comfortable sitting environment can be created in which heat and humidity are not trapped at the back support surface.

Although the air permeable material layers 22 and 32 are made so that air can pass through the insides of the layers in multiple directions, providing vent outlets 40 and configuring the air passages 41 to guide the blown air to the vent outlets 40 enables the blown air to be concentrated at the vent ports 40 and to be discharged from the seat outer covers 21 and 31 with a prescribed range of spread centered at portions corresponding to the vent outlets 40.

Since the vent outlets 40 are arranged in columns oriented in a direction perpendicular to a vehicle-widthwise direction of the seated passenger support surfaces, conditioned air can be discharged along portions of the seat bottom 1A corresponding to the buttocks and thighs of a seated passenger and along portions of the seat back 1B corresponding to both sides of a seated passenger's spine. That is, ventilation can be concentrated at portions where a seated passenger makes close contact and heat and humidity are easily trapped, and a refreshing feeling can be increased.

When a seated passenger makes close contact, the ventilation holes (small openings) of the seat outer covers 21 and 31 and the vent outlets 40 of the air permeable material layers 22 and 33 could feasibly become blocked or crushed by pressure caused by the weight of the seated passenger.

With this embodiment, bypass air passages 43 oriented in a widthwise direction of the vehicle are provided in portions where the air passages 41 communicate with the vent outlets 40. Each of the bypass air passages 43 is open on a side corresponding to a border surface with respect to the air permeable material layer 22 or 32, arranged to extend in a widthwise direction of the vehicle, and closed at a terminal end.

Thus, even if the vent outlets 40 are blocked by pressure caused by the body weight of a seated passenger, blown air can be delivered successively into the bypass air passages 43 and blown from there in a planar direction to the air permeable material layer 22 or 32.

As a result, the blown air is allowed to flow in multiple directions through the insides of the air permeable material layers 22 and 32 near the blocked vent outlets 40 and the seat outer covers 21 and 31 can be ventilated such that a decline in ventilation performance can be avoided.

In particular, in the seat bottom 1A of this embodiment, the bypass air passages 43 are configured to be oriented toward a middle of the seat bottom 1A in a widthwise direction of the vehicle, as shown in FIG. 4. Consequently, the blown air can be ventilated to an area between the thighs L of both legs and a refreshing feeling can be well maintained.

The air passage 41 is configured such that downstream portions thereof are located toward a frontward end of the seat bottom 1A. Since the bypass passages 43 are provided in this downstream region of the air passage 41, the blown air can be ventilated to an area between frontward end portions of the thighs L where the space between the thighs L widens and the ventilation performance can be improved. Providing the bypass air passages 43 in a downstream region of the air passage 41 enables blown air to flow more readily to the bypass air passages 43 and helps further improve the aforementioned ventilation performance.

Meanwhile, in the seat back 1B, the bypass air passages 43 are configured to be oriented toward the outsides of the seat back 1B in a widthwise direction of the vehicle, as shown in FIG. 7. Consequently, the bypass air passages 43 can be disposed in portions separated from a region where a seated passenger makes close contact, a decline of the ventilation performance can be avoided, and heat and humidity can be prevented from being trapped in the region where the seated passenger makes close contact.

The air passage 41 is configured such that downstream portions thereof are located toward a lower end of the seat back 1B. Since the bypass passages 43 are provided in this downstream region of the air passage 41, the ventilation performance can be improved at a portion corresponding to a lower back area B of a seated passenger, where heat accumulation and humidity occur more severely, and an excellent refreshing feeling can be obtained. Moreover, in the seat back 1B, too, providing the bypass air passages 43 in a downstream region of the air passage 41 enables blown air to flow more readily to the bypass air passages 43 and helps further improve the aforementioned ventilation performance.

Also, in both the seat bottom 1A and the seat back 1B of this embodiment, the portion of the air passage that communicates with the vent outlets 40, i.e., the branch passage 41b, is configured as a trough-like section that is open on a side corresponding to a border surface with respect to the air permeable material layer 22 or 32 and extends so as to span across the vent outlets 40 arranged in a column along one direction.

As a result, even at the branch passage 41b, blown air can pass to the air permeable layer 22 or 32 in a planar direction (thickness direction) of the air permeable layer and an improvement of the ventilation performance can be expected.

In addition to the effect of improving ventilation performance, a consistency of communication between the vent outlets 40 and the air passage 41 can be increased because the communication between the air passage 41 and the vent outlets arranged in a column along one direction can be concentrated at a single trough-like section. Additionally, since the branch passage 41b is configured to be open at a surface of the seat cushion pad 20 or 30, the forming of the cushion pads 20 and 30 can be accomplished more easily.

Since each of the bypass air passages 43 is formed such that a passage size thereof narrows as one moves toward a terminal end, the flow speed of the blown air can be made to increase as the blown air approaches the terminal end, thus contributing to improving the ventilation performance.

The bypass air passages 43 are configured to form an obtuse angle θ of 90 degrees or larger with respect to a flow direction of blown air flowing toward a downstream portion of the branch passage 41b. Consequently, the bypass air passages 43 take in blown air readily and can contribute to improving the ventilation performance.

Figure 8:
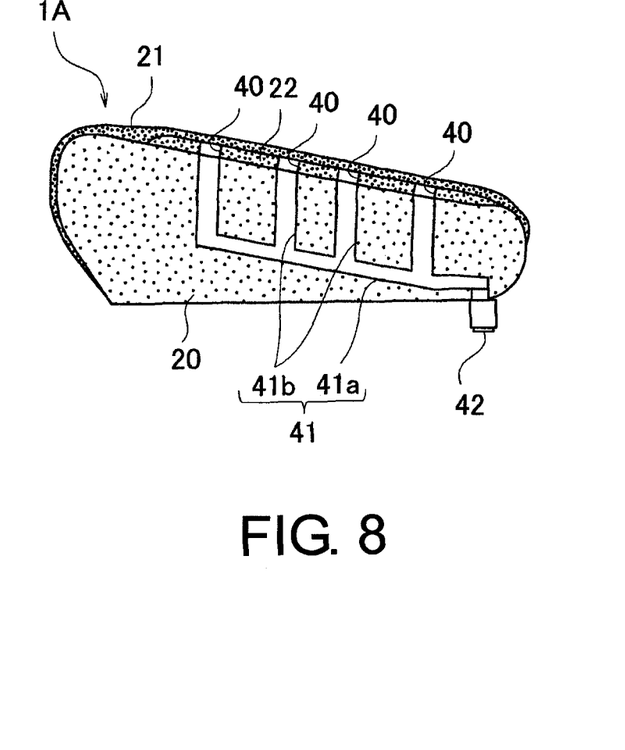
FIG. 8 is a cross sectional view, similar to FIG. 3, of a seat bottom showing a variation in which the air passage is different.

FIG. 8 shows a variation in which the air passages 41 are configured differently and uses the seat bottom 1A as a representative example of a seat body.

In this embodiment, both the main passage 41a and the branch passages 41b of the air passage 41 are formed within the thickness of the seat cushion pad 20.

The main passage 41a is formed along a single direction aligned with a direction in which the vent outlets 40 are arranged. The branch passages 41b are provided such that they communicate with each of the vent outlets 40 arranged along a signal direction and communicate with the main passage 41a in a thickness direction of the seat cushion pad 20.

In the air passage 41 shown in FIG. 8, there is no passage of air from the branch passages 41b to the air permeable material layer 22 in a planar direction (thickness direction) at portions other than the vent outlet 40. Thus, all of the blown air can be concentrated at the vent outlets 40 and allowed to permeate and pass through there.

Although in the previously explained embodiment the bypass air passages 43 are provided in a downstream region of the air passage 41, it is clearly acceptable to provide bypass air passages oriented in a widthwise direction of the vehicle at portions where the air passage 41 communicates with each of the vent outlets 40.

In understanding the scope of the present invention, as used herein to describe the above embodiment(s), the following directional terms "vehicle-widthwise direction" "vehicle-lengthwise direction" "forward", "rearward", "above", "downward", "vertical", "horizontal", "below" and "transverse" as well as any other similar directional terms refer to those directions of a vehicle equipped with the vehicle seat. Accordingly, these terms, as utilized to describe the present invention should be interpreted relative to a vehicle equipped with the vehicle seat. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them unless otherwise specified. The functions of one element can be performed by two, and vice versa unless otherwise specified. The structures and functions of one embodiment can be adopted in another embodiment unless otherwise specified. It is not necessary for all advantages to be present in a particular embodiment at the same time unless otherwise specified. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat comprising;
a cushion pad including a passenger facing surface, a non-passenger facing surface, an air passage having a main passage and a branch passage, and at least one bypass air passage, the main passage extending from an air introducing port disposed at the non-passenger facing surface to the branch passage, the branch passage being formed along the passenger facing surface, the bypass air passage extending from the branch passage in a vehicle-widthwise direction of the cushion pad;
a breathable outer cover disposed over the passenger facing surface of the cushion pad; and
an air permeable material layer disposed between the cushion pad and the breathable outer cover, the air permeable material layer including a plurality of vent outlets passing through in a thickness direction of the air permeable material layer, the vent outlets being arranged in a direction perpendicular to the vehicle-widthwise direction,
the bypass air passage extending from the branch passage in the vehicle-widthwise direction adjacent one of the vent outlets, the bypass air passage including a pair of side faces facing with respect to each other and an end face connecting the side faces together and blocking air blown through the branch passage and into the bypass air passage, the bypass air passage having an interior cross sectional passage size, which narrows as viewed in a top plan view of the passenger facing surface, as the bypass air passage moves toward a terminal end of the bypass air passage, the terminal end being defined by the end face of the bypass air passage,
the branch passage and the bypass air passage being at least partially open on the passenger facing surface where the cushion pad borders with the air permeable material layer such that the air blown through the branch passage is distributed to the vent outlets and the blown air flows along the bypass air passage in a direction transverse to the thickness direction of the air permeable material layer.

2. The vehicle seat according to claim 1, wherein the cushion pad and the outer cover form a seat bottom with the bypass air passage extending towards a middle of the seat bottom in the vehicle-widthwise direction.

3. The vehicle seat according to claim 2, wherein the branch passage has a downstream portion that is located toward a frontward end of the seat bottom, and the bypass air passage is in a downstream region of the air passage.

4. The vehicle seat according to claim 1, wherein the cushion pad and the outer cover form a seat back with the bypass air passage extending towards outside of the seat back in the vehicle-widthwise direction.

5. The vehicle seat according to claim 4, wherein the branch passage has a downstream portion that is located toward a lower end of the seat back, and the bypass air passage is in a downstream region of the air passage.

6. The vehicle seat according to claim 1, wherein the branch passage includes a trough section spanning across the vent outlets that are arranged in the direction perpendicular to the vehicle-widthwise direction.

7. The vehicle seat according to claim 1, wherein the bypass air passage forms an obtuse angle with respect to a flow direction of the blown air in the branch passage.

8. The vehicle seat according to claim 1, wherein the branch passage includes a pair of trough sections spanning across the vent outlets that are arranged in the direction perpendicular to the vehicle-widthwise direction. the columns.

9. A vehicle seat comprising:

a cushion pad including a passenger facing surface, a non-passenger facing surface, an air passage having a main passage and a branch passage, and at least one bypass air passage, the main passage extending from an air introducing port disposed at the non-passenger facing surface to the branch passage, the branch passage being formed along the passenger facing surface, the bypass air passage extending from the branch passage in a vehicle-widthwise direction of the cushion pad;

a breathable outer cover disposed over the passenger facing surface of the cushion pad; and an air permeable material layer disposed between the cushion pad and the breathable outer cover, the air permeable material layer including a plurality of vent outlets passing through in a thickness direction of the air permeable material layer, the vent outlets being arranged in at least one column that extends in a direction perpendicular to the vehicle-widthwise direction, the bypass air passage extending from the branch passage in the vehicle-widthwise direction adjacent one of the vent outlets, the bypass air passage having an interior cross sectional passage size, which narrows as viewed in a top plan view of the passenger facing surface, as the bypass air passage moves toward a terminal end of the bypass air passage, the branch passage and the bypass air passage being at least partially open on the passenger facing surface where the cushion pad borders with the air permeable material layer such that air blown through the branch passage is distributed to the vent outlets and the blown air flows along the bypass air passage in a direction transverse to the thickness direction of the air permeable material layer, the branch passage including a first passage and a second passage that extend in the direction perpendicular to the vehicle-widthwise direction, the air permeable material layer being formed as a pair of first and second strips that extend in the direction perpendicular to the vehicle-widthwise direction, the first strip and the second strip covering at least partially the first passage and the second passage, respectively.

* * * * *